June 17, 1947.   R. T. PALMER   2,422,560
COLD AIR AND RECIRCULATED AIR MIXING AND DISTRIBUTING
MEANS IN AN OVERHEAD AIR CONDITIONING DUCT SYSTEM
Filed Aug. 19, 1944
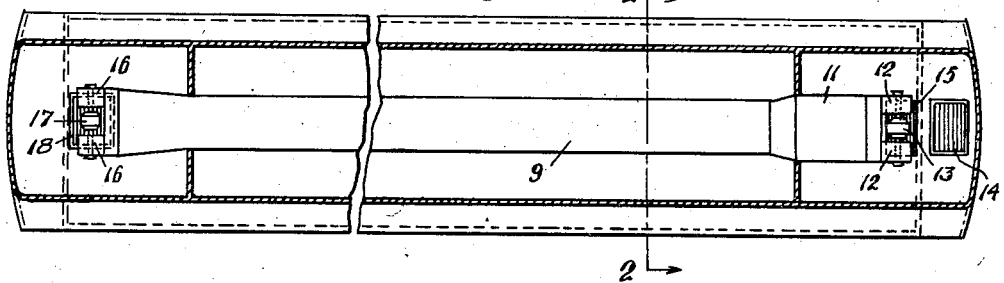
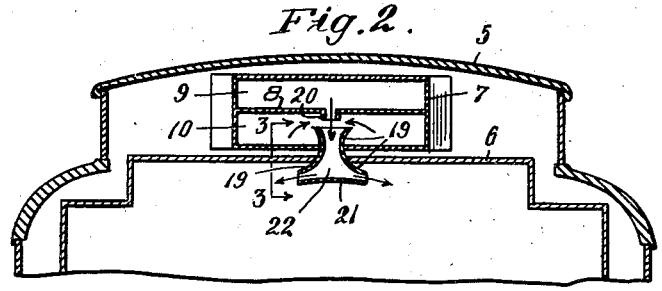
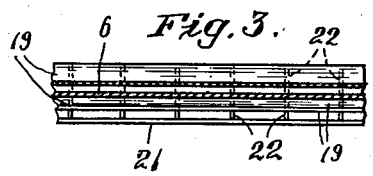
Inventor.
Robert T. Palmer Patented June 17, 1947

2,422,560

UNITED STATES PATENT OFFICE 2,422,560

COLD AIR AND RECIRCULATED AIR MIXING AND DISTRIBUTING MEANS IN AN OVERHEAD AIR CONDITIONING DUCT SYSTEM

Robert T. Palmer, Sharon, Mass., assignor to B. F. Sturtevant Company, Boston, Mass.

Application August 19, 1944, Serial No. 550,140

2 Claims. (Cl. 98—10)

This invention relates to air conditioning systems and relates more particularly to air conditioning systems for passenger vehicles such as railway passenger cars.

The S. M. Anderson Patent No. 2,204,114 discloses an air conditioning system of the most advanced type for railway passenger cars. A low dew point temperature is maintained in a refrigerant dehumidifier for ensuring low humidities in the air delivered to the passenger space, and the dehumidified air is reheated by mixture with air recirculated from the passenger space, in an overhead distributing duct.

This invention represents an improvement over that of said Anderson patent in that the dehumidified air is more thoroughly mixed with, and reheated by, the recirculated air.

An object of this invention is to mix cold dehumidified air in an overhead distributing duct structure, thoroughly with recirculated air for reheating the dehumidified air.

Another object of the invention is to distribute air chilled to a low dew point temperature, into the passenger space of a passenger vehicle, without drafts.

The invention will now be described with reference to the drawing, of which:

Fig. 1 is a plan view, partially in section, looking downwardly upon a railway passenger car embodying this invention;

Fig. 2 is a sectional view along the lines 2—2 of Fig. 1, and

Fig. 3 is a side view below the ceiling of the air distributing duct of Fig. 2.

In the clerestory space of the car, between the roof 5 and the ceiling 6 thereof, the longitudinal distributing duct 7 is arranged over the longitudinal center of the car. The duct 7 is divided by the horizontal partition 8 into the upper passage 9 and the lower passage 10.

The upper passage 9 connects with the discharge outlet of the refrigerative dehumidifier 11 arranged in one end of the car, and which may be similar to that disclosed in said Anderson patent. The dehumidifier 11 has the blowers 12 driven by the motor 13 and which draw outdoor air through the grille 14 and recirculated air from the passenger space through the grille 15, and force the mixed air through the dehumidifier and into the passage 9.

The lower passage 10 connects with the blowers 16 in the other end of the car, which blowers are driven by the electric motor 17 and which draw air recirculated from the passenger space, through the grille 18 and force it into the lower passage 10.

The curved plates 19 extend within the passage 10 and through a central slot in the lower wall thereof and through a larger central slot in the ceiling 6 to points below the ceiling, and form therebetween a Venturi shaped passage having an air inlet below the nozzle 20 in the partition 8.

The curved plate 21 is spaced below the lower ends of the plates 19 and is supported therefrom by the straps 22 which may be brazed or welded thereto.

The nozzle 20 may be a continuous slit in the partition 8 or may be made up of a plurality of small spaced openings. The passage provided by the nozzle 20 for air from the passage 9 into the passage 10 is relatively small so that a substantial static pressure can be built up in the passage 9. This ensures equal flow through the nozzle for the full length of the passage 9.

The dehumidified air from the nozzle 20 flows centrally between the plates 19 and is enveloped by recirculated air from the passage 10 which flows into the inlet of the Venturi like passage between the plates 19 or both sides of the air stream from the nozzle 20. The air streams mix thoroughly in the passage between the plates 19 so that the dehumidified air is thoroughly reheated and discharged without stratification into the passenger space.

The air pressures in the passages 9 and 10 are so regulated, of course, that the higher pressure is in the passage 9 so that the flow will be from the passage 9 into the passage 10. The pressure in the passage 9 may be made sufficiently higher than that in the passage 10, so that the air projected through the nozzle 20 may be ejector air inducing the flow of recirculated air from the passage 10 into the space between the plates 19.

The passages formed by the space between the plates 19 and between the plate 21 and the lower ends of the plates 19 are relatively large in area compared to the discharge area of the nozzle 20 so that while the air discharged through the nozzle 20 has a relatively high velocity, the air discharged into the passenger space has a relatively low velocity.

As will be observed with reference to Fig. 2, the lower ends of the plates 19, and the plate 21 provide air discharge passages in which the air is deflected towards the sides of the car so that it is not blown directly downwardly into the passenger space.

While the duct 7 has been described as a single duct divided into upper and lower passages, two superimposed ducts could be used. Likewise, while the blowers supplying air into the lower passage 10 have been described as located in the opposite end of the car from the blowers supplying air into the upper passage 9, all blowers could be located in the same end of the car.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. An air conditioning system comprising means forming two aligned air passages overhead the space to be served with conditioned air, means for supplying chilled air under pressure, into one of said passages at one end thereof, means including a fan for supplying air recirculated from said space, under pressure, into the other of said passages at the opposite end thereof, means for supplying air from one of said passages into the other of said passages, and means for supplying air from said last mentioned passage into said space.

2. An air conditioning system comprising means forming a pair of superimposed air passages overhead the space to be served with conditioned air, means for supplying chilled air, under pressure, into one end of one of said passages, means including a fan for supplying air recirculated from said space, under pressure, into the opposite end of the other of said passages, means for projecting air from the upper of said passages centrally downwardly into the other of said passages, and means for supplying air from said last mentioned passage into said space.

ROBERT T. PALMER.

REFERENCES CITED

The following references are of record in the file of this patent:

UNITED STATES PATENTS

| Number | Name | Date |
|---|---|---|
| 2,340,252 | Palmer | Jan. 25, 1944 |
| 2,275,295 | Greenway | Mar. 3, 1942 |
| 1,754,961 | Neilson | Apr. 15, 1930 |
| 2,286,252 | Bergstrom | June 16, 1942 |
| 2,199,341 | Henney | Apr. 30, 1940 |
| 1,150,540 | Ross | Aug. 17, 1915 |
| 845,047 | Beernink | Feb. 26, 1907 |
| 2,268,014 | Bridges | Dec. 30, 1941 |
| 1,550,714 | Stacey, Jr. | Aug. 25, 1925 |
| 2,220,587 | Strobell | Nov. 5, 1940 |

FOREIGN PATENTS

| Number | Country | Date |
|---|---|---|
| 253,487 | Germany | Nov. 8, 1912 |